(12) United States Patent
Ardavanis et al.

(10) Patent No.: US 8,292,544 B2
(45) Date of Patent: Oct. 23, 2012

(54) DEVICE AND METHOD FOR LOWERING OR RAISING THE END OF AN UNDERWATER PIPE FROM A LAYING VESSEL

(75) Inventors: Kimon Ardavanis, San Remo (IT); Hervé Legaignoux, Istres (FR)

(73) Assignee: Saipem S.A., Montigny le Bretonneux (FR)

( * ) Notice: Subject to any disclaimer, the term of this patent is extended or adjusted under 35 U.S.C. 154(b) by 498 days.

(21) Appl. No.: 12/522,611

(22) PCT Filed: Jan. 10, 2008

(86) PCT No.: PCT/FR2008/050050
§ 371 (c)(1), (2), (4) Date: Sep. 24, 2009

(87) PCT Pub. No.: WO2008/099109
PCT Pub. Date: Aug. 21, 2008

(65) Prior Publication Data
US 2010/0054861 A1    Mar. 4, 2010

(30) Foreign Application Priority Data
Jan. 10, 2007   (FR) ...................................... 07 52612

(51) Int. Cl.
*F16L 1/235* (2006.01)
*F16L 1/15* (2006.01)
(52) U.S. Cl. ...................... 405/168.1; 405/166; 114/268

(58) Field of Classification Search .................. 405/166, 405/168.1, 154.1, 158, 167, 169, 170; 114/268
See application file for complete search history.

(56) References Cited

U.S. PATENT DOCUMENTS 4,486,123 A * 12/1984 Koch et al. .................... 405/169
5,197,716 A * 3/1993 Zibilich et al. ....... 254/134.3 SC
(Continued)

FOREIGN PATENT DOCUMENTS
FR    2792991    4/1999
(Continued)

OTHER PUBLICATIONS

International Preliminary Report on Patentability and English translation of Written Opinion dated Oct. 6, 2009.

*Primary Examiner* — Tara Mayo-Pinnock
(74) *Attorney, Agent, or Firm* — Cozen O'Connor (57) ABSTRACT

A device and a method for lowering or raising the end of an undersea pipe between a vessel and the sea bottom by a carriage moving along an inclined J-lay tower and co-operating with chain-locking devices connecting the top end of the pipe to a storage area by passing over a deflector sheave secured to said carriage. A first chain-locking device is secured to the carriage and serves to lock the abandonment chain while lowering the carriage and the top end of the pipe at the end of the chain, a second locking device then being in an open position at the base of the tower. Thereafter, the abandonment chain is locked at the low portion of the tower with the help of the second chain-locking device, with the first chain-locking device being in the open position while the carriage is being raised.

11 Claims, 6 Drawing Sheets

U.S. PATENT DOCUMENTS

| | | | |
|---|---|---|---|
| 5,380,129 A * | 1/1995 | Maloberti et al. | 405/166 |
| 5,449,252 A * | 9/1995 | Maloberti et al. | 405/166 |
| 6,352,388 B1 * | 3/2002 | Seguin | 405/166 |
| 6,551,027 B2 * | 4/2003 | Willis et al. | 405/158 |
| 6,729,802 B2 * | 5/2004 | Giovannini et al. | 405/158 |
| 6,733,208 B2 * | 5/2004 | Stockstill | 405/169 |
| 6,796,742 B1 * | 9/2004 | Roger et al. | 405/166 |
| 2002/0021942 A1 * | 2/2002 | Willis et al. | 405/166 |
| 2003/0099515 A1 * | 5/2003 | Giovannini et al. | 405/158 |
| 2005/0224260 A1 * | 10/2005 | Ayling | 175/423 |

FOREIGN PATENT DOCUMENTS

| | | |
|---|---|---|
| FR | 2801088 | 11/1999 |
| FR | 2793540 | 11/2000 |
| WO | WO2006/027189 | 3/2006 |

* cited by examiner

DEVICE AND METHOD FOR LOWERING OR RAISING THE END OF AN UNDERWATER PIPE FROM A LAYING VESSEL

PRIORITY CLAIM

This is a U.S. national stage of application No. PCT/FR2008/050050, filed on Jan. 10, 2008. Priority is claimed on the following application(s): Country: France, Application No.: 0752612, Filed: Jan. 10, 2007, the content of which is incorporated here by reference.

FIELD OF THE INVENTION

The present invention relates to a device for lowering or raising an undersea pipe between the sea bottom and a vessel on the surface, the device making it possible, once the pipe has been assembled and laid from a laying vessel, to lower the top end of said pipe down to the sea bottom from the vessel.

These operations of lowering and raising the top end of the pipe are also called respectively "abandonment" and "recovery" of the pipe. The device of the invention is particularly useful for abandoning and recovering pipes laid at sea in very great depths, i.e. depths of more than 1000 meters (m).

The present invention relates more particularly to undersea pipes made up of unitary pipe elements that are assembled together end to end, preferably by being welded on board said laying vessel.

The present invention also relates to a method of lowering the top end of an undersea pipe from a laying vessel down to a certain depth of immersion, and preferably down to the sea bottom, the other end of the pipe resting on the sea bottom, or of raising said end from said immersed depth, preferably from the sea bottom, up to a vessel on the surface, said vessel being fitted with a lowering or raising device of the invention.

The term "vessel" is used herein to designate any movable floating assembly that is suitable for laying a pipe.

More particularly, the invention applies specifically to laying an undersea pipe made up of rectilinear segments also known as "strings" that are assembled to one another by welding on board the vessel, generally having a length of 24 m or 48 m, with the pipe thus being laid bit by bit, each segment or "string" itself possibly being made up of a plurality of unitary pipe elements that are themselves assembled together by welding to constitute a string.

The device and the method of the invention for abandoning and recovering an undersea pipe thus relates, during abandonment, to the last step of laying the pipe once it has been assembled in full and it is desired to lower the end of the pipe made in this way to the desired depth, and in particular the sea bottom.

BACKGROUND OF THE INVENTION

Prior assembly of the various pipe portions on board the vessel, and then laying of the pipe on the sea bottom piece by piece by assembling strings together and then immersing the pipe little by little as the strings are assembled together is performed traditionally, in particular when laying undersea pipes in depths of more than 1000 m, or even 2000 m, by a method known as J-laying in which the suspended undersea pipe adopts a curved configuration between its anchor point at the surface via the vessel and its point of contact with the sea bottom, said shape corresponding to a mathematical curve known as a catenary for which the radius of curvature increases regularly going from the bottom up to the surface.

This kind of laying is known as J-laying since the shape of the portion of pipe in suspension between the vessel and the point of contact on the sea bottom is considered, improperly, as being J-shaped. Such J-laying is described in numerous patents, and in particular in the following patents in the name of the Applicant: FR 2 792 991, FR 2 793 540, and FR 2 801 088.

In those patents, a laying vessel is described that is fitted with a J-lay tower that enables the following operations to be performed:

holding stable the emerging top end of the portion of pipe that has already been assembled and that is immersed in suspension;

lowering a new portion of pipe or string, presenting the bottom end of a new portion of pipe or string to said immersing top end of said portion of pipe in suspension;

firmly holding the ends of the portions of pipe for assembling together by welding so that said welding can be performed without risk of damage due to the various movements of the vessel and of the immersed portion of pipe in suspension down to the sea bottom; and finally welding together said pipe portions.

A difficulty during such J-laying lies in the fact that all of the above-mentioned operations need to be performed at a single location situated on the deck of the vessel, and thus close to the bottom end of the tower, and furthermore, all of the operations need to be performed as quickly as possible, given the extremely high hourly operating cost of the laying vessel.

The pipe that is being assembled is held at the bottom portion of the J-lay tower by a system of external clamps, e.g. as described in the Applicant's patent FR 2 801 088, over a length that cannot exceed a few meters.

When assembly of the pipe has terminated, the top end of the pipe is conventionally lowered to the sea bottom with the help of an abandonment device constituted by an abandonment cable wound on an abandonment winch with the end of the cable fastened to the top end of the pipe that is to be abandoned, as explained below in the detailed description given with reference to FIG. 1. In order to ensure that the tension exerted by the abandonment cable on the top end of the pipe acts substantially along the axial direction of the pipe, and in order to enable the tension in the cable to be taken up at the top end of the tower structure, deflector sheaves are interposed on the path followed by the abandonment cable prior to reaching the abandonment winch.

When laying pipe at great depth, in particular at depths of more than 1000 m, e.g. 2000 m or 3000 m, the loads supported by the abandonment winches and sheaves thus correspond to the weight of the suspended portion of pipe, and these loads may exceed 1000 (metric) tonnes (t). Such abandonment winches and sheaves therefore needs to be dimensioned accordingly so as to withstand such tensions, however for the winch, given the great length of cable required that means a large amount of space and volume is needed on the deck or in the hold of the vessel in order to receive the abandonment winch.

When laying pipes in great depths, the huge nature of the traction means that need to be implemented for the abandonment step is almost unachievable in practice, and in any event would be extremely expensive when using conventional means involving abandonment winches and cables.

SUMMARY OF THE INVENTION

An object of the present invention is thus to provide a novel device and a novel method for recovering the end of a pipe between a vessel on the surface and the sea bottom without suffering from the above-mentioned drawbacks even when the sea bottom is at great depth, in particular at a depth of more than 1000 m, or indeed more than 2000 m or 3000 m.

More particularly, the object of the present invention is to provide a device and a method for abandoning a pipe at great depths, which device and method are more compact and less expensive than known abandonment cable and winch type equipment when such equipment is adapted to be capable of abandoning a pipe in great depth.

To this end, the present invention provides a device for lowering or raising an undersea pipe between a vessel on the surface and the sea bottom, said pipe being constituted by unitary pipe elements assembled end to end, preferably by welding, said lowering and raising device being installed on board a laying vessel and serving, at the end of assembling and laying the pipe from said vessel, to lower the top end of said pipe down to the sea bottom from the vessel, the other end of the pipe resting on the sea bottom and the remainder of the pipe being immersed in suspension, preferably in a configuration that is substantially in the form of a catenary curve, said lowering or raising device comprising:

a structure mounted on board said vessel and forming a variable-inclination tower in an inclined position, suitable for receiving and supporting at least the terminal unitary pipe element comprising the top end of said pipe, the remainder of the pipe being immersed in suspension down to its other end lying on the sea bottom;

said tower being fitted with at least one guide element, and preferably at least one guide rail, suitable for guiding a movable gripper, preferably a carriage, in the longitudinal axial direction of the tower; and said movable gripper being suitable for being moved in translation along said guide element by means for actuating it in translation between a high position and a low position of said tower;

said lowering or raising device being characterized in that:

it comprises an abandonment chain fastened to the top end of said pipe and extending through said tower to said movable gripper, passing around connection-guide means, preferably a first sheave secured to said carriage so as to pass subsequently to a storage area where the free end of said chain is stowed, the portion of the abandonment chain between said first sheave and said storage area being subjected solely to the tension due to its own weight;

said movable gripper being fitted with a first chain-locking device, preferably a chain-locking device, suitable for locking said abandonment chain when it is in a closed position and for releasing said connection when said first locking device is in an open position; and a second chain-locking device being mounted at the bottom end of said tower below said low position of said gripper and of the tower, suitable for locking said abandonment chain when said second locking device is in a closed position and for releasing said chain when said locking device is in an open position.

The present invention also provides a method of lowering the top end of an undersea pipe to a certain depth of immersion, preferably to the sea bottom, from a laying vessel, the other end of the pipe resting on the sea bottom, or a method of raising said end from said depth of immersion (H), preferably from the sea bottom up to a vessel on the surface, said vessel being fitted with a device of the invention.

According to the method of the present invention, the following successive steps are performed:

1) locking said connection, preferably said abandonment chain, at said movable gripper (5) with the help of a said first connection-locking device, preferably a chain-locking device (7), and lowering or raising said movable gripper between said high position and said low position of said inclined tower, said second chain-locking device (8) being in said open position, said first chain-locking device in the closed position taking up the tension created by the weight of the immersed portion of the suspended pipe; then 2) locking said connection and preferably said abandonment chain at the low portion of said tower with the help of said second chain-locking device, and then with said first chain-locking device in said open position, raising or lowering said movable gripper as the case may be, said second chain-locking device in the closed position taking up the tension created by the weight of the immersed portion of the suspended pipe; and 3) repeating steps 1) and 2) to lower or raise, as the case may be, the end of the pipe stepwise through a length corresponding to the distance traveled by said movable gripper between said high and low positions of the movable gripper along said tower, until the top end of said pipe is lowered to the level of a desired immersed position (H), in particular the sea bottom (21), or until the end of said pipe has been raised to said vessel.

More particularly, said means for actuating said movable gripper in translation comprises at least one first cable having one end wound on a first winch mounted on said tower, the other end of said cable being fastened to said movable gripper, said first cable extending between said first winch and said movable gripper by passing around a second sheave mounted at the top of said tower, the winding and unwinding of said first cable serving respectively to raise and lower said movable gripper.

Given the fact that the first cable presents a length wound around said first winch that is relatively short, given that the length to be wound on or off when raising or lowering said movable gripper of the carriage type corresponds substantially to the length of the J-lay tower, i.e. about 50 m, for laying strings of 25 m to 50 m, said first winch is therefore relatively compact, in particular in comparison with the abandonment winch used in the prior art.

The device of the invention makes it possible for the major portion of the tension to which the abandonment chain is subjected to be taken up almost completely by the structure of the J-lay tower, insofar as the various tension forces to which the abandonment chain is subjected are directed along the longitudinal axis direction of the J-lay tower, accurately along the axis of said tower.

Advantageously, the storage area comprises a storage well for storing said chain and co-operating with a windlass close to said well and suitable for co-operating with said chain so as to enable said chain to be emptied out from said well while said movable gripper is moving up, or respectively so as to enable said chain to be stowed in said well while said movable gripper is moving down.

Under such circumstances, said means for guiding the abandonment chain that are secured to the movable gripper, preferably said first sheave, rotate while said movable gripper is moving up, thereby enabling said chain to be emptied from its storage area, and while the movable gripper is moving down, said first sheave does not rotate and said abandonment chain is stowed progressively in its storage area.

If the final stage of abandonment requires greater accuracy, in particular in order to match the end of the pipe with a target to which it is to be connected, such as a wellhead at the bottom of the sea, it is also advantageously possible for said vessel to include an additional lowering device or lowering the end of the pipe and enabling lowering to be finalized when the end of the pipe is close to the immersed level at which it is desired to stabilize the pipe, preferably close to the sea bottom, said additional lowering device comprising a second cable referred to as an abandonment cable attached to the end of said chain in suspension and actuated from a second winch referred to as an abandonment winch on board the vessel, and suitable for withstanding the tension created by the weight of a portion of the pipe in suspension plus the weight of the abandonment chain in suspension that is less than or equal to 500 t at said abandonment winch, and preferably a tension that is less than or equal to 250 t.

Implementing this additional abandonment device is particularly useful when the end of a pipe is lowered from a vessel down to a depth of more than 1000 m, preferably more than 2000 m. Under such circumstances, descent is finalized using an abandonment cable connected to the end of the suspended chain and actuated from an abandonment winch that is suitable for supporting the tension created by the weight of a suspended portion of pipe plus the weight of the suspended abandonment chain, together creating a tension that is less than or equal to 500 t at the abandonment winch, when said pipe end is at a depth that is sufficient for the weight of the suspended portion of pipe plus the suspended abandonment chain to create a tension that is less than or equal to 500 t, and preferably less than or equal to 250 t at said abandonment winch.

Also advantageously, said structure mounted on board said vessel forming a tower in an inclined position is a tower of an undersea pipe laying device known as a J-lay device, said J-lay device comprising:

a first pipe-grip device with self-locking wedges located at the low portion of said tower, preferably below the low position of the stroke of said movable gripper, and suitable for holding the top end of the pipe; and a second pipe-grip device with self-locking wedges secured to said movable gripper, suitable for locking the top end of the pipe and for moving it along the tower in the longitudinal axial direction thereof below said movable gripper.

More particularly, in a J-lay device including a lowering or raising device of the invention:

said tower has a tilt axis in its low portion suitable for enabling said tower to occupy a said variable inclination;

a lift beam suitable for being pivoted relative to said tower about the same tilt axis, said lift beam being suitable for supporting and lifting at least one unitary pipe element, preferably a string comprising two to four unitary pipe elements assembled together by welding, from a horizontal position to a said inclined position so as to transfer said unitary pipe elements to said tower, said lift beam preferably being actuated in pivoting with the help of a third cable having one end wound onto a third winch mounted on said tower and the other end of said third cable being fastened to a fastener point on said lift beam, said third cable extending between said third winch and said lift beam by passing around at least one third sheave mounted at the top of said tower, winding and unwinding said third cable serving respectively to raise and lower said lift beam; and a tower support and tilt beam fitted with a rack device suitable for moving said tower in tilting so as to vary its inclination and suitable for maintaining said tower in a said inclined position.

Implementing a J-lay device makes it possible to use, as said movable gripper of the lowering or raising device of the invention, the carriages and carriage actuator means that are conventionally implemented in J-lay tower devices, by adding to said carriage and to the base of said tower, in addition to the first and second pipe-grip devices with self-locking wedges, said first and second chain-locking devices of the present invention.

The additional equipment required by the present invention for abandoning or recovering the pipe at the sea bed thus consists in a said abandonment connection or chain and said first and second abandonment connection or chain-locking devices.

In a particular embodiment of the invention, said chain-locking devices comprise pairs of shoes facing each other on either side of the chain and suitable for being actuated to move, preferably to tilt, by means of pairs of actuators between a said closed position and a said open position, the shape of said shoes enabling the abandonment chain to be locked in said closed position.

BRIEF DESCRIPTION OF THE DRAWINGS

Other aspects, characteristics, and advantages of the present invention appear more clearly in the light of the following detailed description made by way of non-limiting illustration and with reference to the drawings, in which:

in FIGS. 4, 4A, and 4B, the carriage is going down towards the bottom portion of the tower;

DETAILED DESCRIPTION OF THE PREFERRED EMBODIMENTS

Figures 1, 1A, 1B:
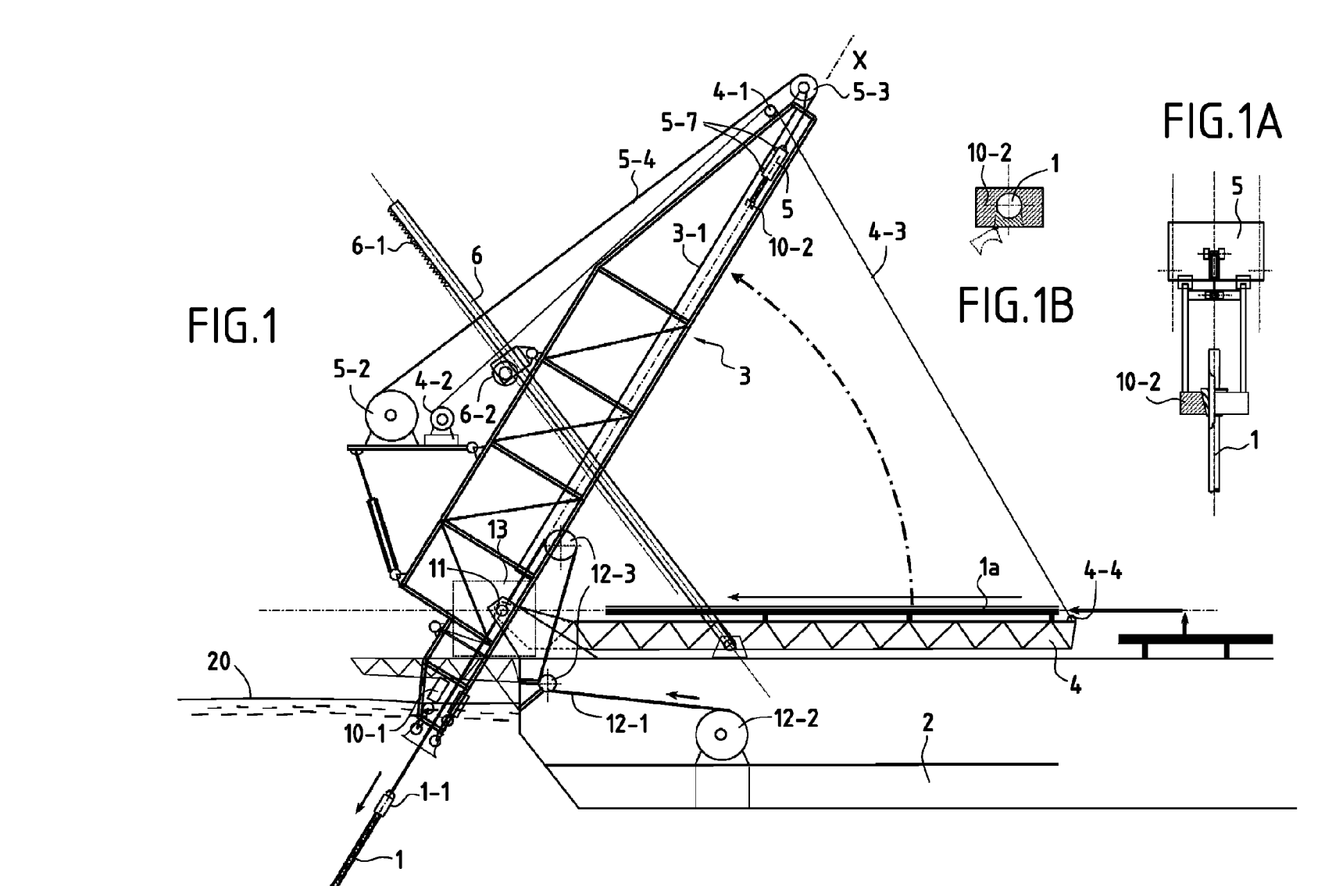
FIG. 1 is a diagrammatic side view of the abandonment stage at the end of J-laying using the traditional technique with the help of an abandonment winch and an abandonment cable mounted at the stern of a laying vessel fitted with a J-lay tower.
FIGS. 1A and 1B are a detailed side view (FIG. 1A) and section view (FIG. 1B) of a said pipe-grip device with self-locking wedges seen from the side in the detail view (FIG. 1A) and in section through its self-locking wedges (FIG. 1B)

FIG. 1 is a side view of a J-lay tower installed on board an installation vessel 2, constituted by a main structure in the form of a tower 3 of variable inclination that can be tilted from being substantially horizontal to beyond the vertical by pivoting about its tilt axis 11 at the bottom portion of the tower.

The J-lay device also includes a lift beam 4 suitable for being hinged to pivot relative to said tower 3 about the same tilt axis 11. This lift beam is suitable for supporting and lifting at least one unitary pipe element 1a, in general a string of two to four unitary pipe elements assembled together by being welded one to another, said string representing a length of 24 m or 48 m. Said lift beam is thus raised from a substantially horizontal position in which the string or the unitary pipe element 1a for assembly is installed on said beam. Said beam is then caused to pivot about the axis 11 with the help of a said third cable 4-3 having one end wound on a third winch 4-2, and having the other end of the third cable 4-3 fastened to the end of the lift beam 4, said third cable 4-3 passing around at least one third deflector sheave 4-1 at the top of said tower 3. Winding said second cable on its winch enables the lift beam 4 to be raised to the level at which the tower is inclined, thereby enabling the unitary pipe element 1a or string to be transferred to within said tower. Said third cable 4-3 is connected to the end of the lift beam 4 via a fastener point 4-4.

The tower 3 co-operates with a second beam, referred to as a tower support and tilt beam 6, that is fitted with a rack device 6-1 associated with drive means 6-2 suitable for causing the tower to tilt so as to vary its angle of inclination and thus hold the tower in stable manner in a said inclined position by adjusting its angle of tilt.

Once the unitary pipe element 1a or string has been transferred to the top of the tower, the top end of the string is gripped by a said pipe-grip device 10-2 having self-locking wedges supported by a movable carriage 5 having wheels 5-7 enabling it to move in translation along the longitudinal axial direction XX' of the tower along guide rails 3-1 between a high position (FIG. 1A) and a low position situated substantially in the horizontal plane of the tilt axis 11 of the tower, with the new string thus being lowered so as to take up a position facing the emerging top end of the previously-assembled pipe, having an immersed portion that is in suspension following a catenary curve down to its point of contact with the sea bottom 21.

The emerging top end of said already-assembled pipe is held securely to the base of the J-lay tower with the help of a said first pipe-grip device 10-1 having self-locking wedges, similar to said grip device 10-2 with self-locking wedges shown in FIGS. 1A and 1B, except that the first pipe-grip device with self-locking wedges is secured to the base of the tower while the second device with self-locking wedges is secured to the moving carriage.

Thereafter, the bottom end of the string or unitary pipe element 1a lowered within the J-lay tower 3 to face the emerging top end of the pipe 1 that is securely fastened to the base of the tower, and is welded thereto in a welding cabin 13. After welding, said first grip device 10-1 with self-locking wedges is released, and the tension from the pipe is then supported entirely by the carriage 5 of the tower via said second grip device 10-2 with self-locking wedges, and then the carriage is lowered towards the bottom of the tower so as to immerse said pipe through a length corresponding to the length of the most recent string or the most recent unitary pipe element 1a that has been welded thereto. Thereafter, at the end of the stroke, said first grip device 10-1 with self-locking wedges is once more locked to the emerging top end of the suspended immersed pipe. The carriage 5 is then returned empty towards the top of the tower and the following string or unitary pipe element 1a is transferred by the lift beam 4 so as to perform the following string-assembly cycle, followed by immersion of the pipe.

When the complete pipe has thus been built and laid, the top end of the end pipe is connected to a said abandonment cable 12-1 that is connected via sets of sheaves 12-3 to a said abandonment winch 12-2. The tension is then taken up by said abandonment winch 12-2 and the deflector sheaves 12-3. The abandonment step is performed continuously by unwinding the abandonment winch while causing the laying vessel 2 to advance in synchronized manner so as to conserve an acceptable amount of curvature at the bottom of the catenary that is substantially constant for said pipe at its point of contact with the sea bottom 21.

That conventional procedure presents the drawback of giving rise to considerable forces on the sheaves 12-3 since the two strands of the abandonment cable on either side of the sheaves are subjected to a traction force corresponding to the weight of the suspended pipe. This means that said sheaves 12-3 need to be supported in the tower by means that withstand substantially twice the load represented by the suspended pipe. Furthermore, the abandonment cable must be continuous in order to be capable of being stored correctly by being wound on the drum of the abandonment winch 12-2 and to be capable of passing without difficulty through the various motor-driven sheaves 12-3. Thus, when the depth of water is extreme, e.g. 2000 m or 3000 m, or even more, and when the weight of the immersed portion of the suspended cable may reach or exceed 1000 t, the necessary abandonment cable 12-1 needs to be dimensioned accordingly, as must be abandonment winch 12-2 and the sheaves 12-3, which then need to become rather bulky and require housings of large volume to be available for them on the deck or in the hold of the vessel. Thus, for an existing vessel having a tower of load-bearing capacity that has been increased by reinforcing its structure, or by installing a new tower, e.g. to go from the ability of supporting a load of 400 t to 1000 t, or even more, integrating the new traction means for the abandonment stage of laying a pipe at great depths (depths of more than 1000 m or 2000 m) becomes practically impossible because of the large size of this type of heavy equipment and because of the amount of equipment that is already in place on the deck and in the holds of the vessel. Furthermore, the deflector sheaves 12-3 present on the path of the abandonment cable need to be reinforced and their nominal diameter needs to be increased in direct proportion with the diameter of the newly-implemented abandonment cable, thus generally making it practically impossible to perform the necessary modifications. Having a plurality of said deflector cables 12-3 serves to ensure that the last sheave on the tower is subjected to tensions that are directed substantially along the axis XX' of the tower at the axis of said sheave.

Figure 2A:
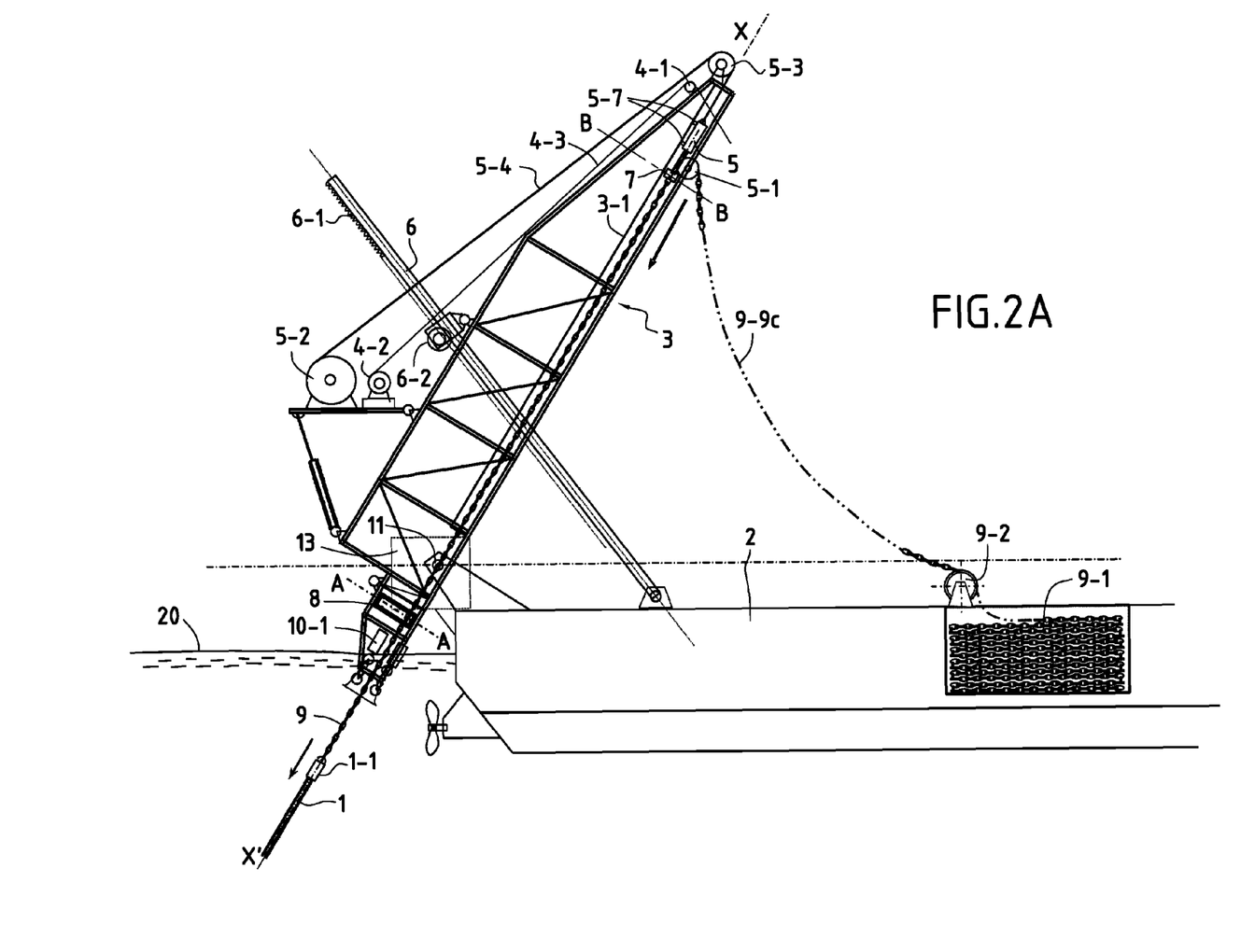
FIGS. 2A and 2B are side views of the stern of a laying vessel fitted with a device for lowering or raising a pipe to or from the sea bottom, referred to below as an abandonment device of the invention, comprising an abandonment chain supporting the tension from the pipe while it is being abandoned prior to lowering the carriage at the top of the tower (FIG. 2A) and during lowering (FIG. 2B)

In FIG. 2A, and in the following figures, there are shown the abandonment device and method of the present invention.

The abandonment device of the present invention, as shown in FIG. 2A and the following figures, and incorporated in a J-lay device comprising a J-lay tower, comprises an abandonment chain 9 fastened to the top end 1-1 of the pipe and extending within the tower 3 along the axial longitudinal direction XX' of the tower to a moving carriage 5, and then passes around a first loose sheave 5-1 secured to said carriage 5 and then goes to a storage well 9-1 in the hold of the vessel 2, the storage well 9-1 being fitted with a motor-driven windlass 9-2.

The portion of the abandonment chain 9c between said first sheave 5-1 and said windlass 9-2 is subjected substantially solely to the tension due to its own weight.

The abandonment device of the present invention also includes the moving carriage 5 of a traditional J-lay tower, said moving carriage 5 nevertheless being fitted additionally with a said first chain-locking device 7.

Finally, the abandonment device of the present invention also includes a second chain-locking device 8 mounted in the bottom portion of the tower 3 immediately above said first pipe-grip device 10-1 with self-locking wedges at the bottom portion of the tower 3, and beneath the lowest position of the movable carriage 5 in its down stroke along the tower 3.

The movable carriage 5 is moved in translation along the guide rail 3-1 that extends in the axial longitudinal direction XX' of the tower 3 by said first cables 5-4 having one end wound on a first winch 5-2 mounted on the support structure of said tower, the other end of said first cable 5-4 being fastened to the top of said movable carriage 5, said first cable 5-4 extending between said first winch 5-2 and said carriage 5 by passing around a said second deflector sheave 5-3 mounted at the top of the tower 3, with winding or unwinding of said first cable 5-4 serving to raise or to lower said movable carriage 5 along the tower 3 between a high position (FIG. 2A) and a low position (not shown).

Said pipe-grip devices with self-locking wedges are known to the person skilled in the art. Similarly, said first and second chain-locking devices as shown respectively in FIGS. 4A, 4B, 5, 6A, and 7 are also known to the person skilled in the art and are constituted in this example by pairs of shoes 7-1 and 8-1 that can be tilted when actuated by actuators 7-2 and 8-2.

Figure 4:
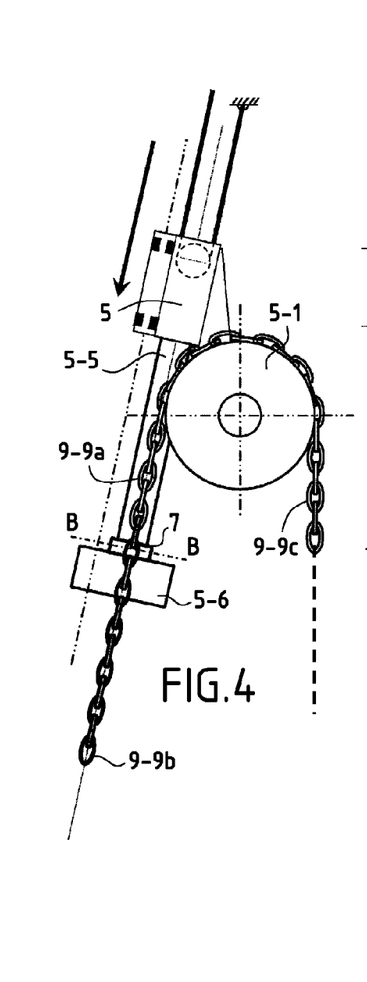
FIG. 4 is a side view of a movable carriage 5 of the J-lay tower supporting a loose sheave 5-1 of an abandonment device 9 of the invention, with the first chain-locking device thereof being shown in detail in the closed position in FIG. 4A in side view, and in section on BB as seen from above in FIG. 4B.
Figure 4A:
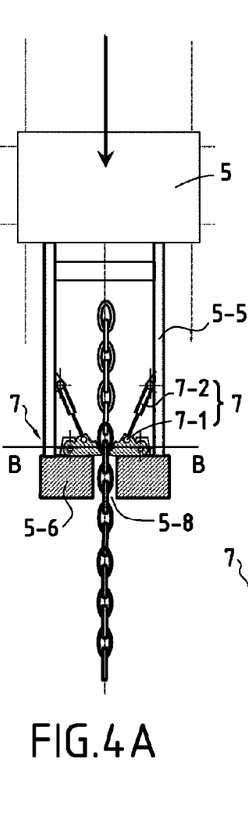

Said first chain-locking device 7 is connected to the carriage 5 by arms 5-5 enabling the locking device 7 to be spaced apart with a sheave 5-1 being interposed between the carriage and said first chain-locking device. Said first chain-locking device 7 is held by an abutment 5-6 that includes a central hole 5-8 suitable for passing the chain 9.

Figure 8:
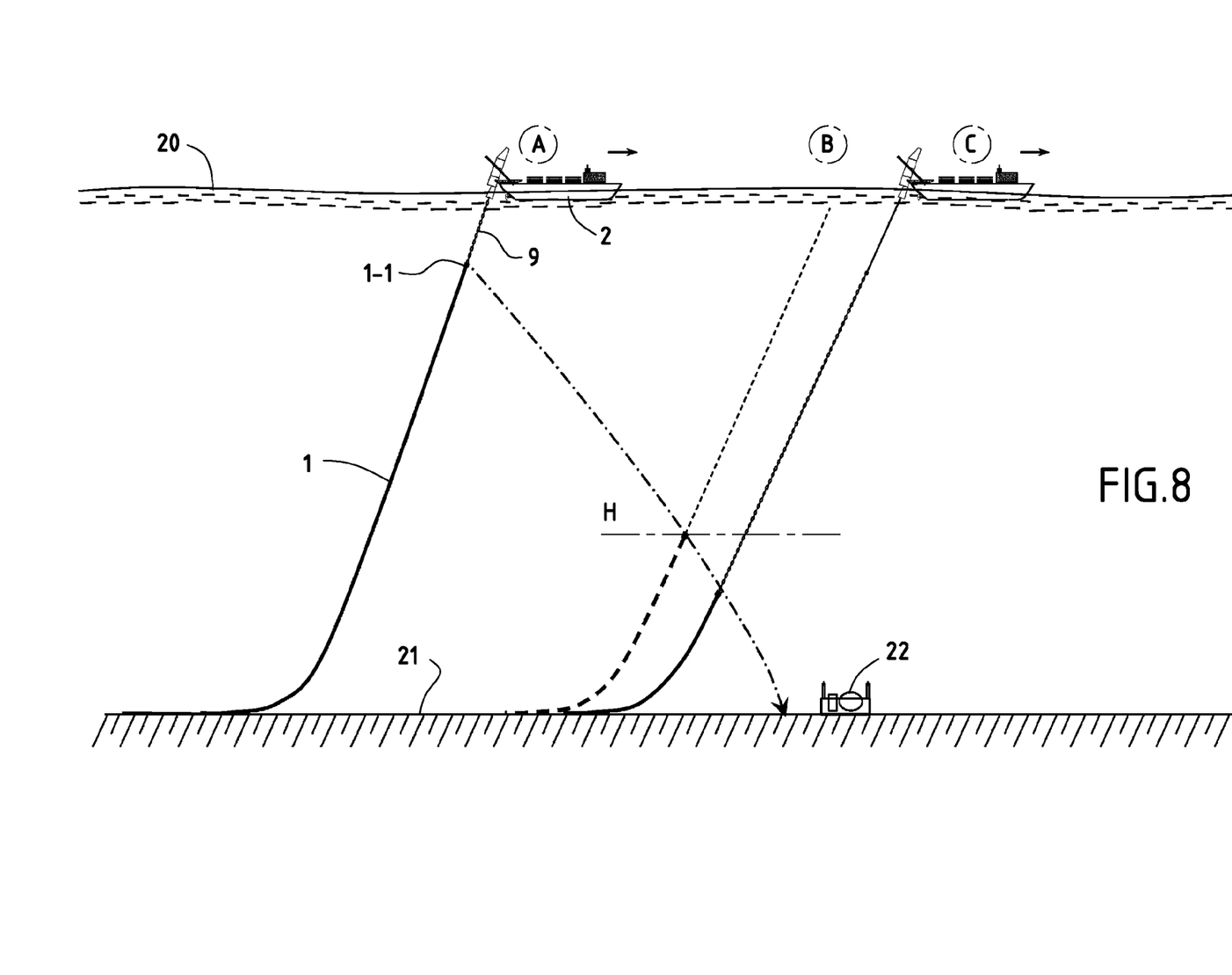
FIG. 8 is a diagrammatic side view of the abandonment stage at the end of J-laying an undersea pipe in great depths from a vessel fitted with a J-lay tower and an abandonment device of the invention, in three successive steps A, B, and C of said abandonment, for the purpose of connecting the end of the pipe 1-1 to a wellbore head 22.

The chain-locking devices 7 and 8 comprise pairs of shoes 7-1 and 8-1 placed facing one another on either side of the chain and suitable for being actuated to move, preferably to tilt, by means of pairs of actuators 7-2 and 8-2 between a so-called closed position and a so-called open position, the shape of said shoes enabling the abandonment chain to be locked in said closed position.

The shape of the ends of the shoes 7-1 and 8-1 serves to hold the chain 9 that can be subjected to high levels of tension that may be as great as 1000 t and/or more, with the shape of said shoes being designed as a function of the shape of the chain so as to lock onto the chain via a wedge link between the link above and the link below.

In the initial stage of abandonment in the abandonment method of the invention, the end of the chain 9 is moved up to the end 1-1 of the assembled pipe, which end is in position at the bottom of the tower, with the carriage 5 also being in the bottom portion of said tower, the end of the pipe being held in tension by the first pipe-grip device 10-1 having self-locking wedges, and the chain-locking device being in the open position. The carriage is moved towards the top of the tower, and on reaching the top, the first chain-locking device 7 secured to the carriage is locked and thus takes up the tension via the carriage 5. Thereafter, the first pipe-grip device 10-1 with self-locking wedges is released. Then the said carriage is lowered along the tower 3 with said second chain-locking device at the low position in the tower still being in the open position. When the carriage 5 reaches the bottom of the tower, its downwards movement is stopped and said abandonment chain is locked using said second chain-locking device at the bottom portion of the tower, and said first chain-locking device secured to the carriage 5 is unlocked, i.e. it is opened, and the carriage 5 is moved back up to the top of the tower.

While the movable carriage 5 is moving up and down, the chain 9 remains under tension within said tower 3 between the low position of the tower at said second locking device 8 and the level of the carriage and said first chain-locking device 7 within said tower 3.

While the moving carriage is moving down, the abandonment chain 9 supports the weight of the immersed suspended pipe. In contrast, while the carriage is moving up, the portion of chain 9a within the tower is subjected to tension that is due essentially solely to its own weight. Furthermore, during the abandonment stage, both when the carriage is moving up and when it is moving down, the portion of chain 9c between the sheave 5-1 secured to the carriage 5 and the windlass 9-2 close to the storage well 9-1 is subjected to tension that is due essentially solely to its own weight. While the carriage is moving down and up, the abandonment chain 9 co-operates with the winch 9-2 so as to enable the chain to be emptied out from the well 9-2 while the carriage 5 is moving up, or to enable the chain to be stored within the well while the carriage 5 is moving down.

Said first sheave 5-1 rotates while the movable carriage 5 is moving up, while said first sheave 5-1 does not rotate while the movable carriage 5 is moving down.

FIG. 2A is a side view of the abandonment device of the invention during the initial stage of abandonment corresponding to the vessel moving from position A to position B in FIG. 8 with the abandonment chain being capable of supporting the tension created by the suspended pipe, e.g. 1000 t. It is connected to the top end 1-1 of the pipe and then locked via the first chain-locking device 7 at the carriage 5 in the tower, and then passes over the loose sheave 5-1 to reach a second sheave that is motor-driven, acting as a winch 9-2 so as to reach its storage area, e.g. the storage well 9-1 situated in the bottom of the hold of the vessel 2. In this configuration, the abandonment chain is subjected to traction corresponding to the 1000 t load represented by the weight of the suspended pipe, said traction acting accurately along the axis XX' of the tower so that the entire load is transferred to the structure of the tower 3 in the axial direction, i.e. under the best possible conditions of compression and bending, with the tilt axis 11 at the base of the tower being subjected to shear forces only.

Furthermore, the beam 6 for tilting the tower 3 is likewise subjected to only limited levels of force since the portion 9c of the abandonment chain that is in suspension between the loose sheave 5-1 and the well 9-1 is not under tension, thereby imparting to the structure of said tower 3 only small off-center forces caused by the weight of said abandonment chain 9, whereas the main load of 1000 t is transmitted to said tower accurately along its axis.

Figures 2B, 3:
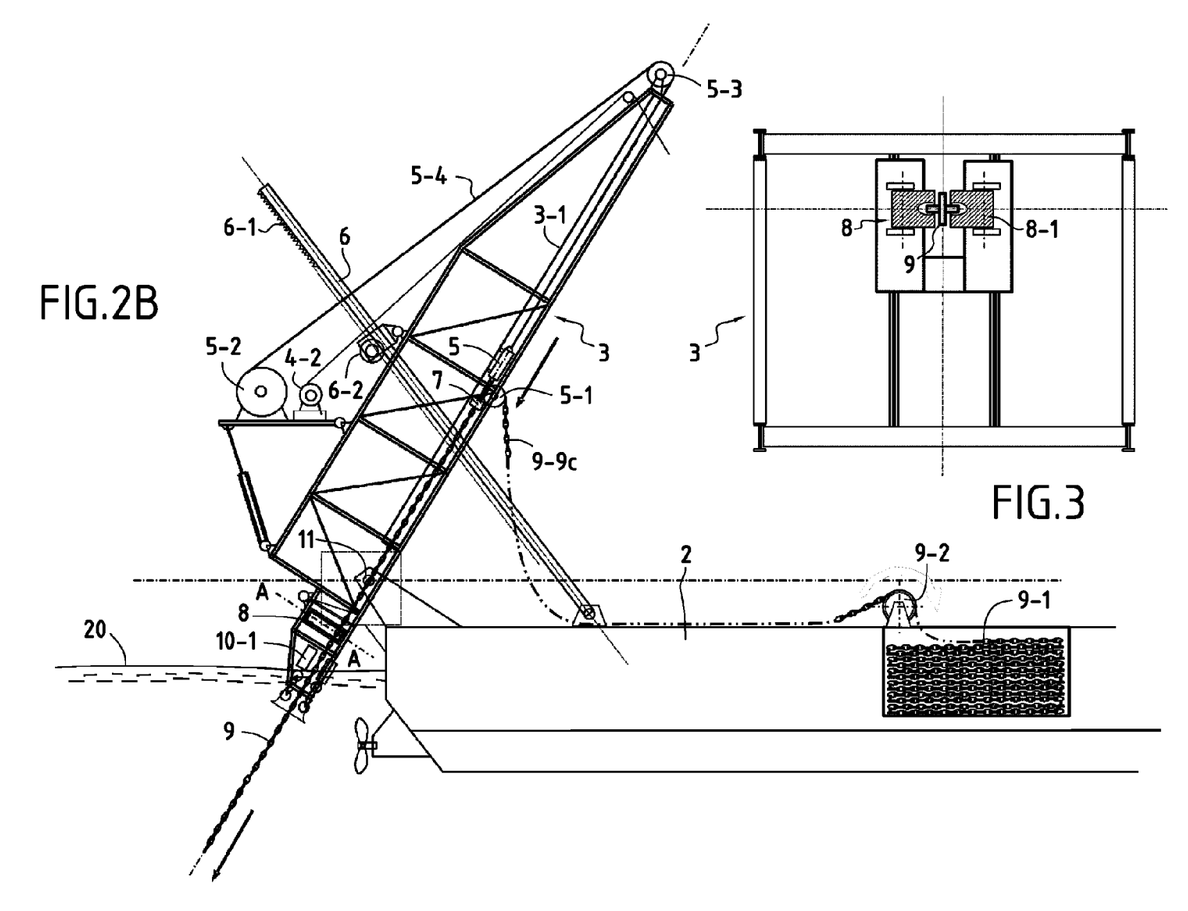
FIG. 3 is a plan view in section on plane AA of FIG. 2B showing a said second chain-locking device at the base of the J-lay tower.

For reasons of clarity in explanation, some of the means of the J-lay tower, such as the lift beam 4, are not shown in FIGS. 2A and 2B.

Figure 4B:
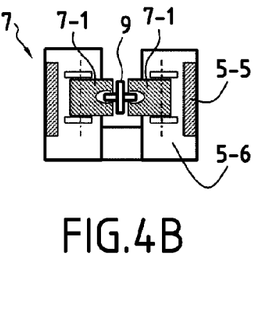
Figure 5:
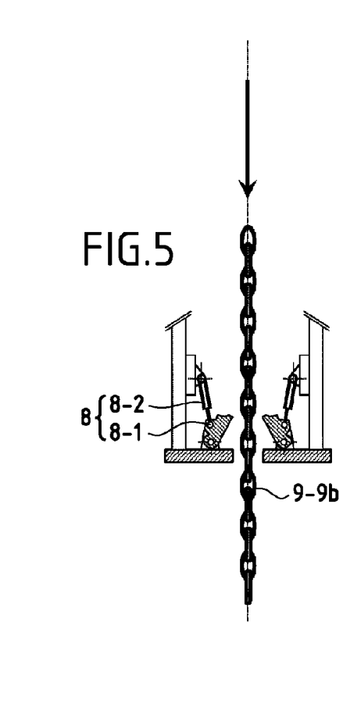
FIGS. 5 and 7 are face views of a second chain-locking device situated at the bottom portion of the J-lay tower and shown in the open position (FIG. 5) and in the closed position (FIG. 7)
Figure 6:
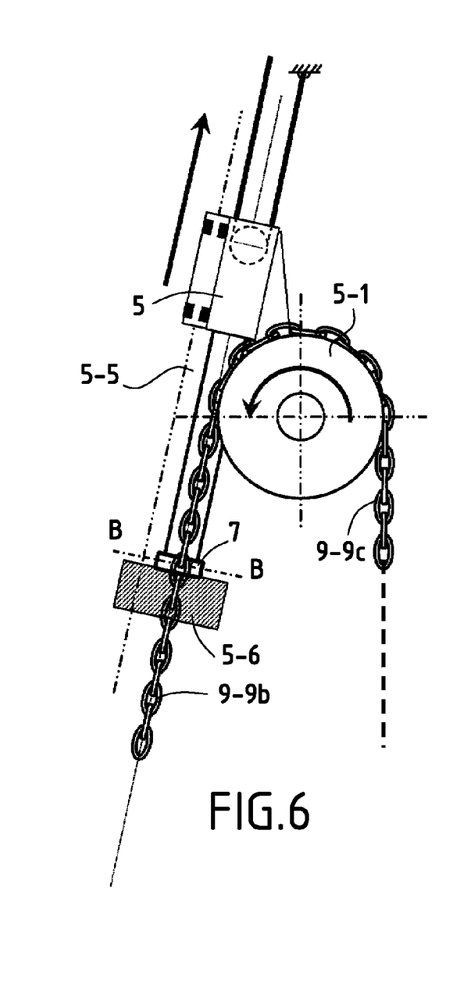
FIGS. 6 and 6A are side views similar to FIGS. 4 and 4A in which the first chain-locking device is in the open position, the chain rising back towards the top of the tower.
Figure 6A:
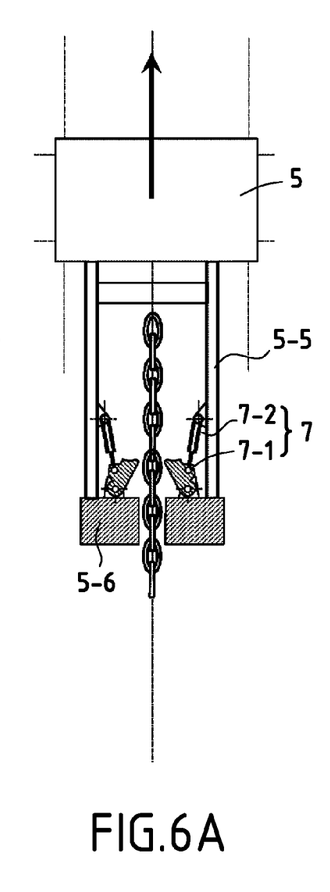
Figure 7:
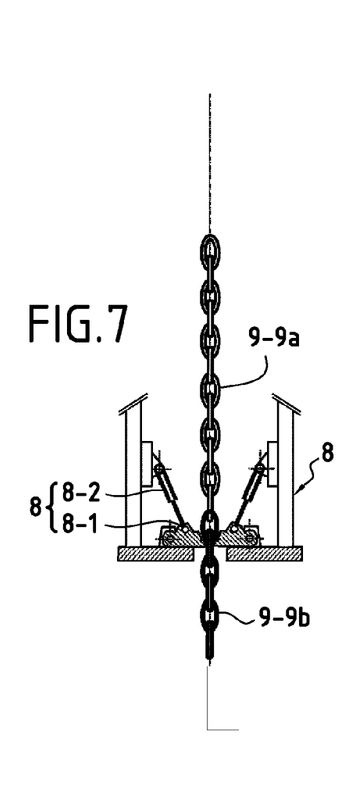

In FIGS. 3, 5 and 7, there are various views respectively in section on AA seen from above (FIG. 3) and side views (FIGS. 5 and 7) showing said chain-locking device 8, said first chain-locking device 7 being shown in side view in FIGS. 4A and 6A, and in section from above in FIG. 4B on plane BB.

For clarity of explanation in FIGS. 4 to 7, the abandonment chain 9 is drawn dark 9b where it is subjected to the abandonment tension, i.e. where it is supporting the weight of the immersed pipe in suspension, and it is drawn pale 9a where it is subjected to its own weight only. The sequence shown in FIGS. 4, 4A, and 5 corresponds to the carriage 5 moving down inside the tower and thus to the top end of the pipe moving down towards the sea bottom, synchronously with the vessel 2 advancing, as explained above with reference to FIG. 8.

In this sequence, the first chain-locking device 7 is in the closed position and the second chain-locking device 8 situated in the bottom portion of the tower in the plane AA is in the open position.

When the carriage 5 reaches the bottom portion of the tower, the actuators 8-2 of the second chain-locking device 8 are actuated to close the shoes 8-1, thereby enabling the load to be taken up at the base of the tower substantially in plane AA, as shown in FIG. 7.

The shoes 7-2 of the first chain-locking device 7 are then opened, as shown in FIG. 6A, thus allowing the carriage 5 to be raised towards the top of the tower, without raising the pipe, thus having the effect of causing the sheave 9-1 to turn counterclockwise and to extract a corresponding needed quantity of chain 9 from the well 9-2, said chain 9 then being subjected substantially to own weight only. When the carriage 5 reaches the top of the tower, the shoes 7-1 of the first chain-locking device 7 are once more closed as shown in FIG. 4A, and then the tension is taken up by the carriage 5 via the first chain-locking device 7. Then, finally, the shoes 8-2 of the second chain-locking device 8 are opened and a new cycle begins of the carriage and thus the chain being lowered and thus a new cycle begins of immersing the top end of the pipe 1-1 further towards the bottom of the sea, as explained above.

Thereafter, the above steps are repeated to lower the top end 1-1 of the immersed pipe in suspension stepwise through a length that corresponds each time to the distance traveled by said movable carriage between said high and low positions of the movable carriage along the tower 3, until the top end 1-1 of the pipe has been lowered directly to the sea bottom 21, or to an immersed position at a depth H, as explained below with reference to FIG. 8.

Thus, lowering takes place stepwise all the way or down to an immersion depth H, with the length of each of the steps corresponding to the distance traveled by the carriage between the high position and the low position of the stroke of the carriage in the tower.

In FIG. 8, there can be seen several steps of the stage of abandoning a pipe 1 in great depth from a vessel 2. The vessel travels towards a wellhead 22 located on the sea bottom 21 to which the end of the pipe 1-1 is to be connected. On the vessel going from position A to position B, the top end 1-1 of the pipe as connected to an abandonment chain 9 is moved towards the wellhead 22 on the sea bottom, and its depth increases until it reaches a depth H when the vessel is in position B.

In FIG. 8, starting from the depth H, the end of the abandonment cable 12-1 is connected to the free end of the chain 9 a little above the plane AA of the second chain-locking device 8. Tension is then taken up by the abandonment winch 12-1 and the shoes of the second locking device 8 are opened with abandonment being continued, preferably continuously, by unwinding the abandonment winch 12-2 synchronously with the advance of the vessel until the entire pipe lies on the sea bottom.

The weight of the immersed pipe in suspension between the point of contact with the sea bottom and the top end 1-1 of the pipe decreases as the top end 1-1 is lowered. Initially, the weight of the suspended portion of the immersed pipe may be as much as 1000 t, for example, when laying in a depth of more than 2000 m.

As mentioned above, as the top end 1-1 of the pipe is lowered towards the sea bottom, the vessel 2 advances so as to conserve catenary-shaped curvature where contact is made with the sea bottom until it reaches the position B where the top end 1-1 of the suspended pipe is at a depth H such that the weight of said pipe in suspension plus the weight of the abandonment chain up to the surface represents a tension, e.g. 400 t, that can be taken up by a traditional abandonment cable 12-1 co-operating with a traditional abandonment winch 12-2 as shown in FIG. 1. Thereafter, abandonment continues using the traditional method with the abandonment cable 12-1 and the abandonment winch 12-2, the vessel moving to a position C, with this last abandonment step making it possible to adjust with greater accuracy the end 1-1 of the pipe while making a connection with the wellhead 22.

As a first example, a steel pipe having an outside diameter of 610 millimeters (mm), and a thickness of 44.45 mm, weighs 625 kilograms per meter (kg/m) when empty in air and weighs 538 kg/m when empty in water, which means that when laid in a depth of 1750 m and with a radius of curvature at its point of contact with the sea bottom of 300 m, the maximum tension at the J-lay tower is 1102 t. To perform abandonment, a chain is used having links with a diameter of 120 mm, of offshore-R5 quality, presenting a breaking strength of 15,782 kilonewtons (kN), i.e. 1608 t, thereby achieving a safety factor relative to breaking of about K=1.46. The tension in the chain when the end of the pipe is laid on the sea bottom is 641 t, and the length of chain emptied out is substantially 2200 m, representing a total weight for the chain of approximately 693 t.

In a second example, the same steel pipe with an outside diameter of 610 mm and a thickness of 44.45 mm weighs 625 kg/m when empty in air and 538 kg/m when empty in water, which gives, for laying in a depth of 1100 m and with a radius of curvature at the point of contact with the sea bottom of 300 m, a maximum tension at the J-lay tower of 752 t. To perform abandonment, a chain is used having links with a diameter of 95 mm, of offshore-R5 quality, presenting a breaking strength of about 10,500 kN, i.e. about 1065 t, thus giving a safety factor of about K=1.42.

When the end 1-1 of the pipe is at a depth H=970 m, the weight of said pipe plus the weight of the suspended chain gives tension at said tower of 397 t, thus allowing the end of the chain to be connected to an abandonment cable 12-1 that is secured to an abandonment winch 12-2 having a maximum capacity of 400 t, with the winch then performing the end of the abandonment method continuously until the end of the pipe lies on the sea bottom close to its target 22. The length of chain emptied out then corresponds to a total length of 1150 m, which represents a chain weighing 228 t, whereas if the chain had been used down to final deposition on the sea bottom, the length of chain needed would have been about 1650 m, representing a chain having a weight of 327 t, i.e. an additional 43%. Thus, under such circumstances, the invention provides a very significant saving in terms of the cost of the chain and in terms of volume and room required for the chain well.

In the invention, the chain is stored in a well incorporated in the laying vessel, however it could equally well be merely stored flat on the deck. Said chain is advantageously stored directly on a barge or on a vessel coupled with the laying vessel solely for the duration of the abandonment or recovery operations, thus making it possible to minimize the occupation of the deck or the holds of the laying vessel.

The abandonment winch 12-2 is described as being a conventional winch, however it remains within the spirit of the invention to use a winch-windlass for this function, or a linear winch, where winches of these types are known to the person skilled in the art.

The invention claimed is:

1. A device for lowering or raising an undersea pipe between a vessel on the surface and the sea bottom, said pipe being constituted by unitary pipe elements assembled end to end, by welding, said lowering and raising device being installed on board a laying vessel and serving, at the end of assembling and laying the pipe from said vessel, to lower the top end of said pipe down to the sea bottom from the vessel, the other end of the pipe resting on the sea bottom and the remainder of the pipe being immersed in suspension, said lowering or raising device comprising:

a structure mounted on board said vessel and forming a variable-inclination tower in an inclined position, suitable for receiving and supporting at least the terminal unitary pipe element comprising the top end of said pipe, the remainder of the pipe being immersed in suspension down to its other end lying on the sea bottom, the tower having a longitudinal axial direction, a bottom end and a to end;

said tower being fitted with at least one guide element, suitable for guiding a movable gripper consisting in a carriage, in the longitudinal axial direction of the tower; and said movable gripper being suitable for being moved in translation along said guide element by means for actuating it in translation between a high position of said top end of said tower relative to a surface of the laying vessel and a low position of said top end of said tower relative to the surface of the laving vessel;

wherein:

said lowering or raising device comprises an abandonment chain having a free end, said chain fastened to the top end of said pipe, extending through said tower to said movable gripper, and passing around a first sheave secured to said carriage, so as to pass subsequently to a storage area where the free end of said chain is stowed, the portion of the abandonment chain between said first sheave and said storage area being subjected solely to the tension due to its own weight;

said movable gripper being fitted with a first chain-locking device, suitable for locking said abandonment chain when it is in a closed position and for releasing said connection when said first locking device is in an open position; and a second chain-locking device being mounted proximate the bottom end of said tower below said low position of said gripper and suitable for locking said abandonment chain when said second locking device is in a closed position and for releasing said chain when said locking device is in an open position.

2. The device according to claim 1, wherein said means for actuating said movable gripper in translation comprises at least one first cable having one end wound on a first winch mounted on said tower, the other end of said cable being fastened to said movable gripper, said first cable extending between said first winch and said movable gripper by passing around a second sheave mounted at the top of said tower, the winding and unwinding of said first cable serving respectively to raise and lower said movable gripper.

3. The device according to claim 1, wherein the storage area comprises a storage well for storing said chain and co-operating with a windlass close to said well and suitable for co-operating with said chain so as to enable said chain to be emptied out from said well while said movable gripper is moving up, or respectively so as to enable said chain to be stowed in said well while said movable gripper is moving down.

4. The device according to claim 1, wherein said vessel includes an additional lowering device for lowering the end of the pipe and enabling lowering to be finalized when the end of the pipe is close to the immersed level at which it is desired to stabilize the pipe, said additional lowering device comprising a second cable referred to as an abandonment cable attached to the end of said chain in suspension and actuated from a second winch referred to as an abandonment winch on board the vessel, and suitable for withstanding the tension created by the weight of a portion of the pipe in suspension plus the weight of the abandonment chain in suspension that is less than or equal to 500 t at said abandonment winch.

5. The device according to claim 1, wherein said structure mounted on board said vessel forming a tower in an inclined position is a tower of an undersea pipe laying device known as a J-lay device, said J-lay device comprising:

a first pipe-grip device with self-locking wedges located at a low portion of said tower, below the low position of the stroke of said movable gripper, and suitable for holding the top end of the pipe; and a second pipe-grip device with self-locking wedges secured to said movable gripper, suitable for locking the top end of the pipe and for moving it along the tower in the longitudinal axial direction thereof below said movable gripper.

6. The device according to claim 5, wherein:

said tower has a tilt axis in its low portion suitable for enabling said tower to occupy a said variable inclination;

a lift beam suitable for being pivoted relative to said tower about the same tilt axis, said lift beam being suitable for supporting and lifting at least one unitary pipe element consisting in a string comprising two to four unitary pipe elements assembled together by welding, from a horizontal position to a said inclined position so as to transfer said unitary pipe elements to said tower, said lift beam being actuated in pivoting with the help of a third cable having one end wound onto a third winch mounted on said tower and the other end of said third cable being fastened to a fastener point on said lift beam, said third cable extending between said third winch and said lift beam by passing around at least one third sheave mounted at the top of said tower, winding and unwinding said third cable serving respectively to raise and lower said lift beam; and a tower support and tilt beam fitted with a rack device suitable for moving said tower in tilting so as to vary its inclination and suitable for maintaining said tower in a said inclined position.

7. The device according to claim 1, wherein said chain-locking devices comprise pairs of shoes facing each other on either side of the chain and suitable for being actuated to move, by means of pairs of actuators between a said closed position and an open position, the shape of said shoes enabling the abandonment chain to be locked in said closed position.

8. The method of lowering the top end of an undersea pipe to a certain depth of immersion, from a laying vessel, the other end of the pipe resting on the sea bottom, or a method of raising said end from said depth of immersion, up to a vessel on the surface, said vessel being fitted with a device according to claim 1, and the method comprising the following successive steps:

A) locking said abandonment chain at said movable gripper with the help of a said first chain-locking device, and lowering or raising said movable gripper between said high position and said low position of said inclined tower, said second chain-locking device being in said open position, said first chain-locking device in the closed position taking up the tension created by the weight of the immersed portion of the suspended pipe; then B) locking said abandonment chain at the low portion of said tower with the help of said second chain-locking device, and then with said first chain-locking device in said open position, raising or lowering said movable gripper as the case may be, said second chain-locking device in the closed position taking up the tension created by the weight of the immersed portion of the suspended pipe; and C) repeating steps A) and B) to lower or raise, as the case may be, the end of the pipe stepwise through a length corresponding to the distance traveled by said movable gripper between said high and low positions of the movable gripper along said tower, until the top end of said pipe is lowered to the level of a desired immersed position, in the sea bottom, or until the end of said pipe has been raised to said vessel.

9. The method according to claim 8, wherein said abandonment chain secured to the movable gripper rotates while said movable gripper is moving up, thereby enabling said chain to be emptied form its storage area, and wherein said first sheave does not rotate while the movable gripper is moving down, said abandonment chain being stowed progressively in its storage area.

10. The method according to claim 8, wherein lowering the top end of the undersea pipe is finalized with the help of an abandonment cable secured to the end of the suspended chain and actuated from an abandonment winch suitable for supporting the tension created by the weight of a portion of pipe in suspension and the weight of the abandonment chain in suspension, together creating a tension that is less than or equal to 500 t at said abandonment winch, when said pipe end is at a depth that is sufficient for the weight of the suspended portion of pipe and the suspended abandonment chain creates a tension that is less than or equal to 500 t at said abandonment winch.

11. The method according to claim 8, wherein the end of the undersea pipe is lowered from a said vessel to a depth of more than 1000 m.

* * * * *